United States Patent Office 2,693,454
Patented Nov. 2, 1954

2,693,454

DRY, STABLE, POWDERED BLEACHING COMPOSITION

Edward C. Soule, Niagara Falls, N. Y., assignor to Mathieson Chemical Corporation, a corporation of Virginia No Drawing. Application October 26, 1951, Serial No. 253,475

4 Claims. (Cl. 252—187)

My invention relates to the manufacture of dry, stable calcium hypochlorite compositions which dissolve quickly in water to produce clear alkaline solutions of strong bleaching, disinfecting and germicidal action. In particular, my invention provides stabilized powdered products containing calcium hypochlorite, sodium tripolyphosphate and potassium carbonate specially compounded for use as a household bleach.

The manufacture of a household bleach in convenient stable dry powdered form has presented so many difficulties that no satisfactory product has appeared on the market despite a recognizable demand. Although aqueous solutions of hypochlorite are relatively expensive and difficult to market and handle, hypochlorite bleaching compositions in solution form have tended to pre-empt the market. The housewife requires a bleach that dissolves quickly, is completely miscible with soap and detergent solutions, which does not create soap precipitation problems and which is quicky acting. Calcium hypochlorite is the most readily available and stable hypochlorite, but it is relatively slow dissolving, produces sediment and creates soap precipitation problems. Sodium hypochlorite on the other hand is too unstable for handling in dry-powdered form and has required utilization in solution form. Proposals have been made to produce bleach compositions consisting of calcium hypochlorite and a sequestering agent such as sodium pyrophosphate, sodium tetraphosphate and sodium hexametaphosphate. (It does not appear to have been previously known, however, that stable mixtures can not be prepared from calcium hypochlorite and sodium tripolyphosphate.) Indeed, it is surprising to find that such mixtures are markedly less stable than the mixtures of any of the other polyphosphates with calcium hypochlorite. This does not appear to be due to moisture content. The calcium hypochlorite usually contains slightly less than 1% of water and the polyphosphates contain substantially less than this amount. In spite of these small proportions of water, stable mixtures of calcium hypochlorite and tetrasodium pyrophosphate, for example, can be prepared. On the contrary, simple mixtures of calcium hypochlorite with sodium tripolyphosphate, having also less than 1% of water, are distinctly unstable.

Aside from stability, sodium tripolyphosphate is much to be preferred for admixture with calcium hypochlorite than any of the other common polyphosphates. Sodium pyrophosphate is distinctly inferior in calcium sequestering ability. Sodium tetraphosphate and sodium hexametaphosphate, while having satisfactory sequestering effectiveness, are more expensive per unit of sequestering capacity and furthermore are hygroscopic. Their admixture with calcium hypochlorite tends to cause the resulting mixtures to cake and thus adversely affect the stability of the hypochlorite when exposed to air.

The adverse effect of sodium tripolyphosphate on the stability of calcium hypochlorite has made it impossible to utilize its particular advantages in such mixtures, namely its combined calcium sequestering ability and its non-hygroscopicity. I have found however that about 1 to 8% of anhydrous potassium carbonate incorporated in the mixture of calcium hypochlorite and sodium tripolyphosphate provides suitable stability for handling and use in dry powdered form. It is difficult to understand why the addition of potash to the composition is effective in improving the stability of the composition particularly since soda ash is ineffective in this respect. Apparently the action is not wholly that of desiccation because sodium tripolyphosphate is less hygroscopic than any of the other polyphosphates. Calcium hypochlorite itself often contains nearly 1% of water and is reasonably stable. It is not clear how the addition of a polyphosphate containing about the same percentage of water would make the composition less stable, particularly when the polyphosphate is non-hygroscopic.

According to my invention about 5 to 12 per cent calcium hypochlorite with about 40 to 90 per cent sodium tripolyphosphate is employed. As little as 1% of potassium carbonate produces a marked improvement in stability of the composition and better stability is obtained by somewhat large amounts. I therefore prefer to use about 5% of anhydrous potassium carbonate and as much as 8% may be used with advantage. Larger amounts appear to add little to the stability of the composition. The proportion of potassium carbonate is also important with respect to one of the important properties of the bleach composition in use. I have found that providing a ratio of sodium tripolyphosphate to potassium carbonate between about 5:1 and about 15:1, with the tripolyphosphate seven or more times the calcium hypochlorite, produces a well buffered solution of pH about 10 to 10.5 which is not harmful to the skin but which has satisfactory alkalinity.

I have also found that it is essential for quick dissolving, quick acting and non-sludging solutions that the particle size of the active components of the dry bleach be related to each other in a particular manner. The calcium hypochlorite should be in semi-granular form; i. e. should pass a 30 mesh screen and remain on 60. Since commercial screening operations intended to produce the 30–60 mesh calcium hypochlorite ordinarily give a product containing minor proportions of finer materials, I prefer that the 30–60 mesh calcium hypochlorite of my invention contain not more than about 20% of fines which pass a 100 mesh screen. The tripolyphosphate must be finely divided and 90% or more should pass through 240 mesh. The potassium carbonate also should be finely divided so that 98% or more passes a 200 mesh screen.

The calcium hypochlorite which I prefer to use in the product of the present invention is one which is a stable product high in available chlorine and low in calcium chloride. Characteristically this hypochlorite contains upwards of 50% available chlorine and with particular advantage, upwards of 60%. The free lime content is preferably maintained at a low value. The calcium hypochlorite referred to is not to be confused with conventional bleaching powder or chlorinated lime from which it differs materially both as to chemical constitution, stability, and its exceptionally high content of available chlorine. As examples of calcium hypochlorite products suitable for use in the composition of the present invention may be mentioned the products whose preparation is described in U. S. Patent Nos. 1,481,039; 1,481,040; 1,713,650; 1,713,654; 1,713,668 and 1,713,669. The high stability which such a hypochlorite product possesses is particularly advantageous in the mixed product of the present invention since it permits storage for considerable periods without decomposition. Other calcium hypochlorite compositions of comparable quality and preferably containing not over about 2% water may be used. It is particularly advantageous, however, to use a calcium hypochlorite which has a high ratio of available chlorine to calcium. When calcium chloride, a very hygroscopic salt, is present in substantial amounts, it not only makes the product difficult to keep dry but also decreases the stability of the product due to the hydrolysis occasioned by the absorbed water.

Suitable proportions of calcium hypochlorite in the present compositions are about 5 to 12% of the composition. A particularly advantageous proportion is about 7%. Lesser amounts of hypochlorite than 5% give products of low available chlorine content and compositions containing more than 12% of calcium hypochlorite cannot be satisfactorily sequestered.

The sodium tripolyphosphate, useful in this invention, is an article of commerce and normally contains less than 1% of water. It has the formula $Na_5P_3O_{10}$. In the compositions of the present invention it is used in proportions of about 40–90% and must be in a proportion by weight of at least 7 to 1 with respect to the calcium hypochlorite product in the mixture in order to sequester the calcium ions completely. Lesser proportions of tripolyphosphate result in incomplete sequestering and this ratio must be maintained in order to prevent the precipitation of calcium soaps in use.

Where the maximum amounts of calcium hypochlorite and sodium tripolyphosphate are not used, the balance of the composition, aside from the desired proportion of potassium carbonate, is made up of an inert diluent salt, usually and preferably sodium chloride. Calcium oxide, however, which has been previously used as a desiccant in hypochlorite compositions cannot be used, because then more tripolyphosphate is required than can be accommodated in the composition. Lime tends to increase the precipitation of insoluble sludge and it must be avoided in order to prepare a composition yielding substantially clear solutions in water.

The diluent salt may be any inorganic salt which is non-hygroscopic or non-liquefying when exposed to air, which is non-hydrated and which has a substantially neutral reaction and is stable to hypochlorite. Sodium chloride is the best example of such a salt although other salts of sodium, potassium and lithium may be used; e. g. anhydrous salt cake ($Na_2SO_4$).

In compounding the mixture of the present invention, it is preferred that the components be finely divided as stated above and that the hypochlorite be added to the composition last. The order of addition is not critical but it is generally advisable to mix all the other components first and add the hypochlorite last when preparing calcium hypochlorite containing compositions. The products are free-flowing compositions of good homogeneity when properly mixed. They have satisfactory chemical and physical stability for storage and shipping, and they may be exposed to the atmosphere under typical conditions of intermittent use without undue loss of activity.

The following examples are intended to indicate the relative stability or instability of representative calcium hypochlorite compositions and to illustrate typical products of my invention. The storage tests referred to are accelerated storage tests of 90 days in closed containers at 55° C. Obviously average daily losses of available chlorine of much above about 0.25% quickly become intolerable from a practical standpoint.

*Example I*

The data in the table below show the results of stability tests on mixtures of various polyphosphates with calcium hypochlorite (Commercial "HTH"). The stability of the calcium hypochlorite is improved in each case except when sodium tripolyphosphate is used. (All the figures are expressed as per cent by weight.)

| $Ca(OCl)_2$, Percent | Sodium Polyphosphate | | Av. Cl, Loss per day, Percent |
|---|---|---|---|
| | Name | Percent | |
| 100 | | | 0.145 |
| 12 | Tetraphosphate | 88 | .136 |
| 10 | Pyrophosphate | a 85 | .028 |
| 22 | Hexametaphosphate | 78 | .052 |
| 12 | Tripolyphosphate | 88 | .348 | a The composition also contained CaO, 5%.

*Example II*

The improvement in stability of mixtures containing 12% of calcium hypochlorite and sodium tripolyphosphate as affected by the further addition of anhydrous potassium carbonate in amounts up to 5% is shown in the table below. For comparison, the decomposition rates of the hypochlorite alone and hypochlorite-tripolyphosphate mixture without potassium carbonate are included.

| $Ca(OCl)_2$, Percent | Sodium Tripolyphosphate, Percent | $K_2CO_3$, Percent | Av. Cl, Loss per day, Percent |
|---|---|---|---|
| 100 | 0 | 0 | 0.145 |
| 12 | 88 | 0 | .348 |
| 12 | 87 | 1 | .056 |
| 12 | 86 | 2 | .050 |
| 12 | 85 | 3 | .040 |
| 12 | 84 | 4 | .048 |
| 12 | 83 | 5 | .016 |

*Example III*

Mixtures of calcium hypochlorite, sodium tripolyphosphate and sodium chloride containing about 7% of the hypochlorite are stabilized by the further addition of anhydrous potassium carbonate as shown in the table below. For comparison, the decomposition rate of the hypochlorite alone, hypochlorite-tripolyphosphate without salt or potassium carbonate and hypochlorite-tripolyphosphate-salt mixtures without potassium carbonate are included.

| $Ca(OCl)_2$, Percent | Sodium Tripolyphosphate, Percent | NaCl, Percent | $K_2CO_3$, Percent | Av. Cl, Loss per day, Percent |
|---|---|---|---|---|
| 100 | 0 | 0 | 0 | 0.145 |
| 7 | 93 | 0 | 0 | .254 |
| 7 | 49 | 44 | 0 | .624 |
| 7 | 50 | 42 | 1 | .217 |
| 7 | 50 | 40 | 3 | .032 |
| 7 | 50 | 38 | 5 | .166 |

I claim:
1. A dry, stable, powdered bleaching composition consisting essentially of about 5 to 12 per cent by weight of semi-granular calcium hypochlorite of 30 to 60 mesh containing not more than 20 per cent fines passing a 100 mesh screen and having an available chlorine content of upwards of 50 per cent, about 40 to 90 per cent by weight of at least 90 per cent through 240 mesh sodium tripolyphosphate in a proportion by weight of at least 7 to 1 with respect to calcium hypochlorite, and about 1 to 8 per cent by weight of at least 98 per cent through 200 mesh anhydrous potassium carbonate.

2. The composition of claim 1 wherein the calcium hypochlorite is in a proportion of about 7 per cent by weight.

3. The composition of claim 1 wherein the potassium carbonate is in a proportion of about 5 per cent by weight.

4. A dry, stable, powdered bleaching composition consisting essentially of about 5 to 12 per cent by weight of 30 to 60 mesh calcium hypochlorite having an available chlorine content of upwards of 50 per cent, about 40 to 90 per cent by weight of at least 90% through 240 mesh sodium tripolyphosphate in a proportion by weight of at least 7 to 1 with respect to calcium hypochlorite, and about 1 to 8 per cent by weight of at least 98% through 200 mesh anhydrous potassium carbonate.

References Cited in the file of this patent

UNITED STATES PATENTS

| Number | Name | Date |
|---|---|---|
| 2,152,520 | Lind | Mar. 28, 1939 |
| 2,166,362 | MacMahon | July 18, 1939 |
| 2,319,697 | MacMahon | May 18, 1943 |
| 2,415,657 | Riggs et al. | Feb. 11, 1947 |
| 2,634,238 | Soule | Apr. 7, 1953 |

FOREIGN PATENTS

| Number | Country | Date |
|---|---|---|
| 469,334 | Great Britain | July 23, 1937 |